(12) United States Patent
Wang et al.

(10) Patent No.: US 10,378,950 B2
(45) Date of Patent: Aug. 13, 2019

(54) HIGH ACCURACY MEASURING DEVICE FOR MEASURING LARGE MASS

(71) Applicant: National Institute of Metrology, Beijing (CN)

(72) Inventors: Jian Wang, Beijing (CN); Changqing Cai, Beijing (CN); Xiaoping Ren, Beijing (CN); Tao Li, Beijing (CN); Manhong Hu, Beijing (CN); Xiaolei Wang, Beijing (CN); Honglei Ji, Beijing (CN); Xiang Wang, Beijing (CN); Ping Chen, Beijing (CN)

(73) Assignee: NATIONAL INSTITUTE OF METROLOGY, Beijing (CN)

( * ) Notice: Subject to any disclaimer, the term of this patent is extended or adjusted under 35 U.S.C. 154(b) by 202 days.

(21) Appl. No.: 15/534,085

(22) PCT Filed: Oct. 12, 2016

(86) PCT No.: PCT/CN2016/099217
§ 371 (c)(1),
(2) Date: Jun. 8, 2017

(87) PCT Pub. No.: WO2018/040135
PCT Pub. Date: Mar. 8, 2018

(65) Prior Publication Data
US 2019/0086255 A1    Mar. 21, 2019

(30) Foreign Application Priority Data
Aug. 29, 2016 (CN) .......................... 2016 1 0755450

(51) Int. Cl.
*G01G 21/04* (2006.01)
*G01G 1/22* (2006.01)
(Continued)

(52) U.S. Cl.
CPC ............... *G01G 21/04* (2013.01); *G01G 1/22* (2013.01); *G01G 1/26* (2013.01); *G01G 23/01* (2013.01)

(58) Field of Classification Search
CPC ............. G01G 21/04; G01G 1/22; G01G 1/26
(Continued)

(56) References Cited

U.S. PATENT DOCUMENTS 4,452,326 A * 6/1984 Hanssen ................ G01G 19/44
177/256
4,458,771 A * 7/1984 Hanssen ................ G01G 19/44
177/256

(Continued)

FOREIGN PATENT DOCUMENTS

CN           2761321 Y  *  3/2006
CN       101893470 A  *  11/2010
(Continued)

OTHER PUBLICATIONS

CN-101893470-A translation (Year: 2010).*
(Continued)

*Primary Examiner* — Natalie Huls
*Assistant Examiner* — Monica S Young
(74) *Attorney, Agent, or Firm* — Meagher Emanuel Laks Goldberg & Liao, LLP

(57) ABSTRACT

The invention relates to a measuring device for measuring the mass of a weight, comprising a main frame, a main beam supported on the main frame and comprising a central knife and two side knives parallel with the central knife; a balancing system loaded on one end of the main beam and comprising a set of counterweights; a weighting system loaded on the other end of the main beam; a weight transportation system capable of transporting and loading a standard weight or a test weight into the weighting system (Continued)

and capable of unloading and transporting them away from the weighting system; and a control system. The central knife and the two side knives are made from metal with a high temperature-cryogenic cycling process. The central knife and the two side knives are configured to be adjusted in parallelism with a three-coordinates measuring machine. The control system is adapted to control the balancing system and the weighting system to synchronously load or unload the balancing system and the weighting system.

9 Claims, 10 Drawing Sheets

(51) Int. Cl.
  *G01G 1/26* (2006.01)
  *G01G 23/01* (2006.01)
(58) Field of Classification Search
  USPC .......................................................... 177/171
  See application file for complete search history.

(56) References Cited

U.S. PATENT DOCUMENTS

| | | | | |
|---|---|---|---|---|
| 5,488,202 A | * | 1/1996 | Baitz | A47F 9/046 177/25.15 |
| 2013/0053752 A1 | * | 2/2013 | Xu | A61B 17/205 604/1 |

FOREIGN PATENT DOCUMENTS

| | | | |
|---|---|---|---|
| CN | 101893470 A | | 11/2010 |
| CN | 201803830 U | * | 4/2011 |
| CN | 104677479 A | | 6/2015 |
| CN | 204439202 U | | 7/2015 |
| CN | 105091768 A | | 11/2015 |
| JP | 56117126 A | | 9/1981 |

OTHER PUBLICATIONS

CN-201803830 A translation (Year: 2012).*
D. Candane Effect of Cryogenic Treatment on Microstructure an Wear Characteristics of AISI M35 HSS, International Journal of Materials Science and Applications. vol. 2, No. 2, 2013, pp. 56-65. Doi: 10.11648/j.ijmsa.20130202.14. (Year: 2013).*
Harbin Institute of Technology, No. 92, West Da-zhi Street, Harbin, Heilongjiang 150001, PR China b Nagoya University, Furo-cho, Chikusa-ku, Nagoya, Aichi 464-8603, JapanAvailable online May 27, 2011 (Year: 2011).*
CN2761321 Translation (Year: 2006).*
International Search Report for PCT/CN2016/099218 dated Feb. 3, 2017.
Written Opinion for PCT/CN2016/099218 dated Feb. 3, 2017.
Huang Liyin. "Influence of Cryogenic-heating Treatment on Mechanical Properties of GH3030 Nickel-based Super Alloy", Hot Working Technology, vol. 45, No. 14, Jul. 25, 2016 (Jul. 25, 2016).

* cited by examiner

HIGH ACCURACY MEASURING DEVICE FOR MEASURING LARGE MASS

TECHNICAL FIELD

The invention relates to a measuring device for measuring the mass of a weight.

BACKGROUND ART

In prior art, the manufacturing process of a central knife, a side knife and respective knife bearings of a mechanical balance for measuring large mass is simple, which can not achieve the hardness and toughness necessary for measuring a heavy weight. Moreover, in prior art, the load synchronization and the consistency between a main beam swing and an indication system of the mechanical balance are both poor, which makes the amount of the horizontal movements of a central knife system and a side knife system can not be reduced during a loading process, therefore the mechanical balance for measuring large mass can not acquire a high accuracy measurement in the progress of measuring the heavy weight.

According to the above reasons, in prior art, a measurement of a 500 kg weight with a repeatability of 0.05 g, a measurement of a 1000 kg weight with a repeatability of 0.5 g, and a measurement of a 2000 kg weight with a repeatability of 1 g can not be achieved.

SUMMARY OF THE INVENTION

An object of the invention is to provide a solution to the problems in prior art that a mass comparator or a mechanical balance can not acquire a high accuracy measurement.

For this end, the invention in one aspect provides a measuring device for measuring the mass of a weight, comprising: a main frame, a main beam supported on the main frame and comprising a central knife and two side knives parallel with the central knife, a balancing system loaded on one end of the main beam and comprising a set of counterweights, a weighting system loaded on the other end of the main beam, a weight transportation system capable of transporting and loading a standard weight or a test weight into the weighting system and capable of unloading and transporting them away from weighting system, and a control system, wherein the central knife and the two side knives are made from metal with a high temperature-cryogenic cycling process, wherein the central knife and the two side knives are configured to be adjusted in parallelism with a three-coordinates measuring machine, and wherein the control system is adapted to control the balancing system and the weighting system to synchronously load or unload the balancing system and the weighting system. This has advantages that the central knife system and the side knife system acquire high parallelism by an adjustment of the three-coordinates measuring machine to ensure an accurate measurement of a 500 kg weight with a repeatability of 0.05 g, a measurement of a 1000 kg weight with a repeatability of 0.5 g, and a measurement of a 2000 kg weight with a repeatability of 1 g.

According to a possible embodiment of the invention, the metal comprises cemented carbide powder as raw material. The central knife and the side knife experience a pre-heating process, a quenching process, multiple tempering processes, a deep cooling process and a final tempering process successively during the high temperature-cryogenic cycling process. This has advantages that the metal has both high hardness and high toughness.

According to a possible embodiment of the invention, the main frame comprises a central knife bearing with a rectangular cross-section. The central knife is adapted to abut against a supporting surface of the central knife bearing by means of its central knife edge. The balancing system and the weighting system both comprise a side knife bearing with a cross-section different from the cross-section of the central knife bearing. The side knife bearing has a side knife groove on its top surface. The side knife groove has a trapezoid cross-section. The side knife is adapted to abut against the supporting surface of the side knife groove by means of side knife edge.

According to a possible embodiment of the invention, the main frame further comprises a main beam motor capable of lifting the main beam up or down. The control system is adapted to control main beam motor to synchronously load or unload the loading on both sides of the central knife during the lift up or down process of the main beam. This has advantages that the damage of the central knife due to uneven stresses on the two end of the central knife is avoided during the lift up or down process of the main beam.

According to a possible embodiment of the invention, the central knife and the side knife are heated stepwise to 500 to 600° C., 800 to 850° C., and 1200 to 1250° C. successively during the pre-heating process. The central knife and the side knife are quenched and cooled to room temperature by air during the quenching process. The central knife and the side knife are tempered to 550 to 570° C. and cooled to room temperature by air during the multiple tempering processes and the final tempering process. The central knife and the side knife are cooled stepwise to about −120° C. and heated stepwise to room temperature during the deep cooling process.

According to a possible embodiment of the invention, the central knife edge has an angle of about 90° between its adjacent sides. The central knife edge has a baseline straightness of less than or equal to 0.006 mm. The central knife edge has a bearing radius of less than or equal to 0.2 mm, and has a surface roughness of less than or equal to 0.025 µm.

According to a possible embodiment of the invention, the supporting surface of the central knife bearing has a flatness of less than or equal to 0.005 mm.

According to a possible embodiment of the invention, the side knife edge has an angle of about 120° between its adjacent sides. The side knife edge has a baseline straightness of less than or equal to 0.01 mm. The side knife edge has a bearing radius of less than or equal to 0.2 mm, and has a surface roughness of less than or equal to 0.025 µm.

According to a possible embodiment of the invention, the side knife groove has an angle of about 140° between its opposing sides. The supporting surface of the side knife groove has a flatness of less than or equal to 0.005 mm.

According to a possible embodiment of the invention, the test weight has a cubic or cylindrical shape.

BRIEF DESCRIPTION OF THE DRAWINGS

The foregoing and other aspects of the invention will be understood and appreciated more fully from the following detailed description taken in conjunction with the drawings, in which.

DETAILED DESCRIPTION OF PREFERRED EMBODIMENTS

Figure 1:
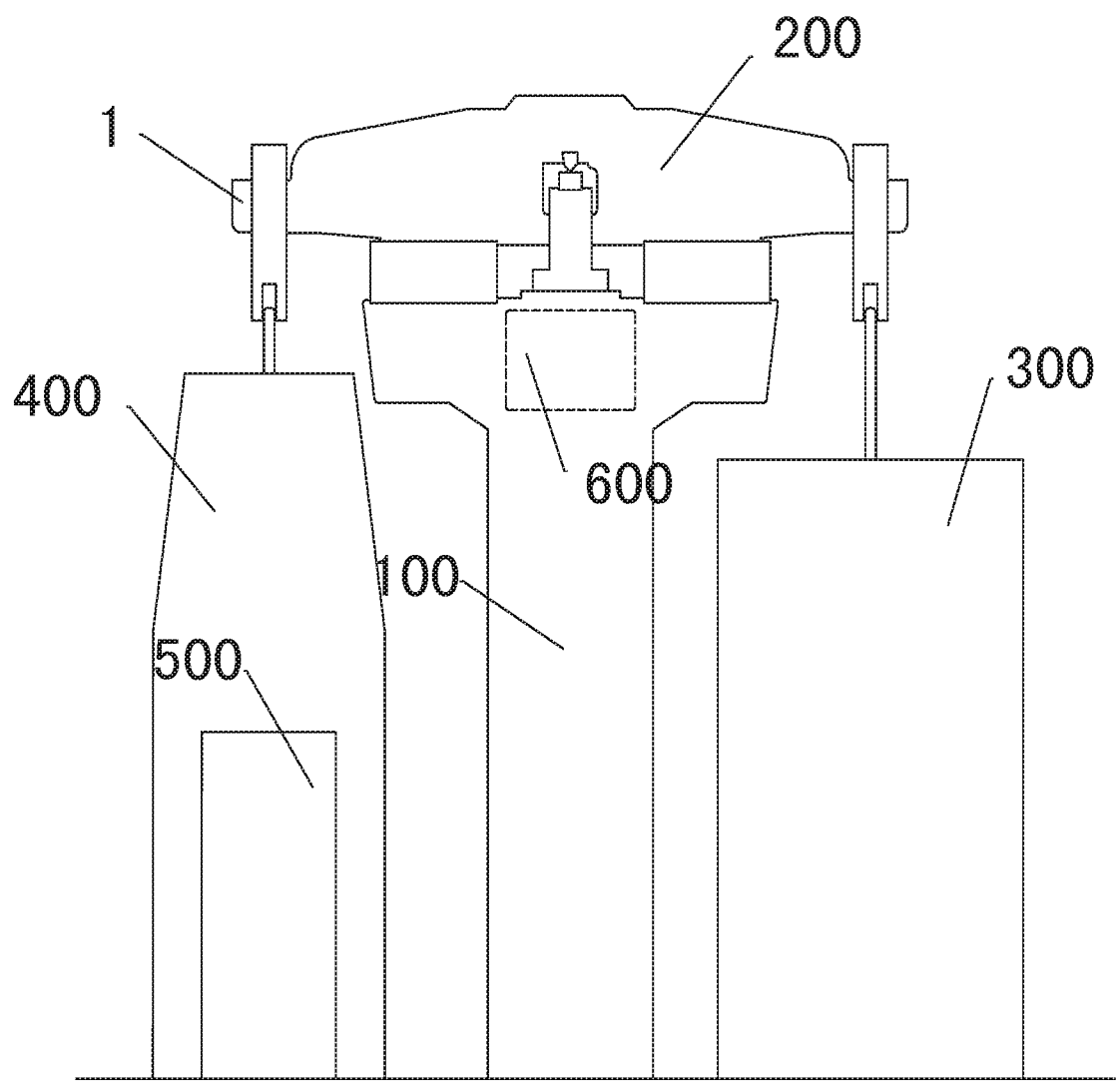
FIG. 1 is a schematic diagram of a measuring device according to a possible embodiment of the invention.

FIG. 1 is a schematic diagram of a measuring device 1 according to a possible embodiment of the invention. As shown in the figure, the measuring device 1 comprises a main frame 100, a main beam 200, a balancing system 300, a weighting system 400, a weight transportation system 500 and a control system 600. The main frame 100 is connected to the balancing system 300 and the weighting system 400 via the main beam 200.

Figure 2:
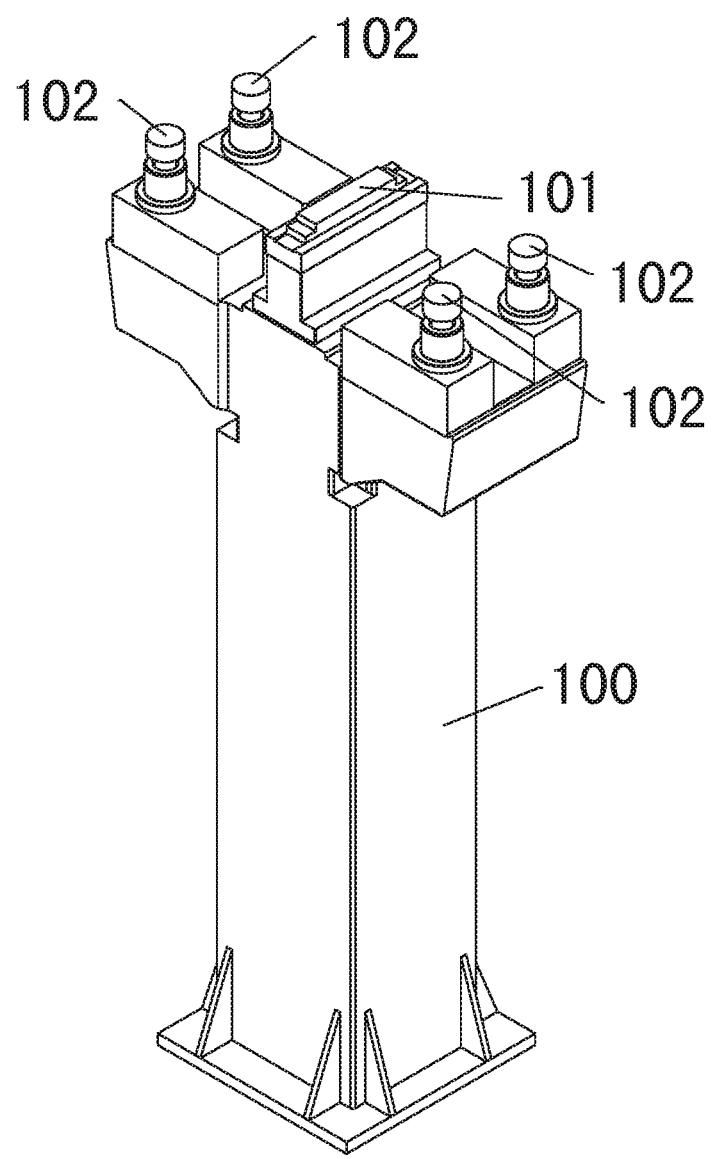
FIG. 2 is a perspective view of a main frame of the measuring device in FIG. 1.

FIG. 2 is a perspective view of the main frame 100 of the measuring device 1 in FIG. 1. As shown in the figure, the main frame 100 comprises a central knife bearing 101 and a main beam motor 102. The central knife bearing 101 is arranged at the center of the top of the main frame 100 and has a rectangular cross-section. The main beam motor 102 is arranged on both sides of the central knife bearing 101 respectively. As will be described in detail in the following, a supporting surface of the central knife bearing 101 is adapted to abut against a central knife edge 201A of a central knife 201. The main frame 100 is adapted to support the main beam 200 and lift the main beam 200 up or down via the main beam motor 102.

Figure 3:
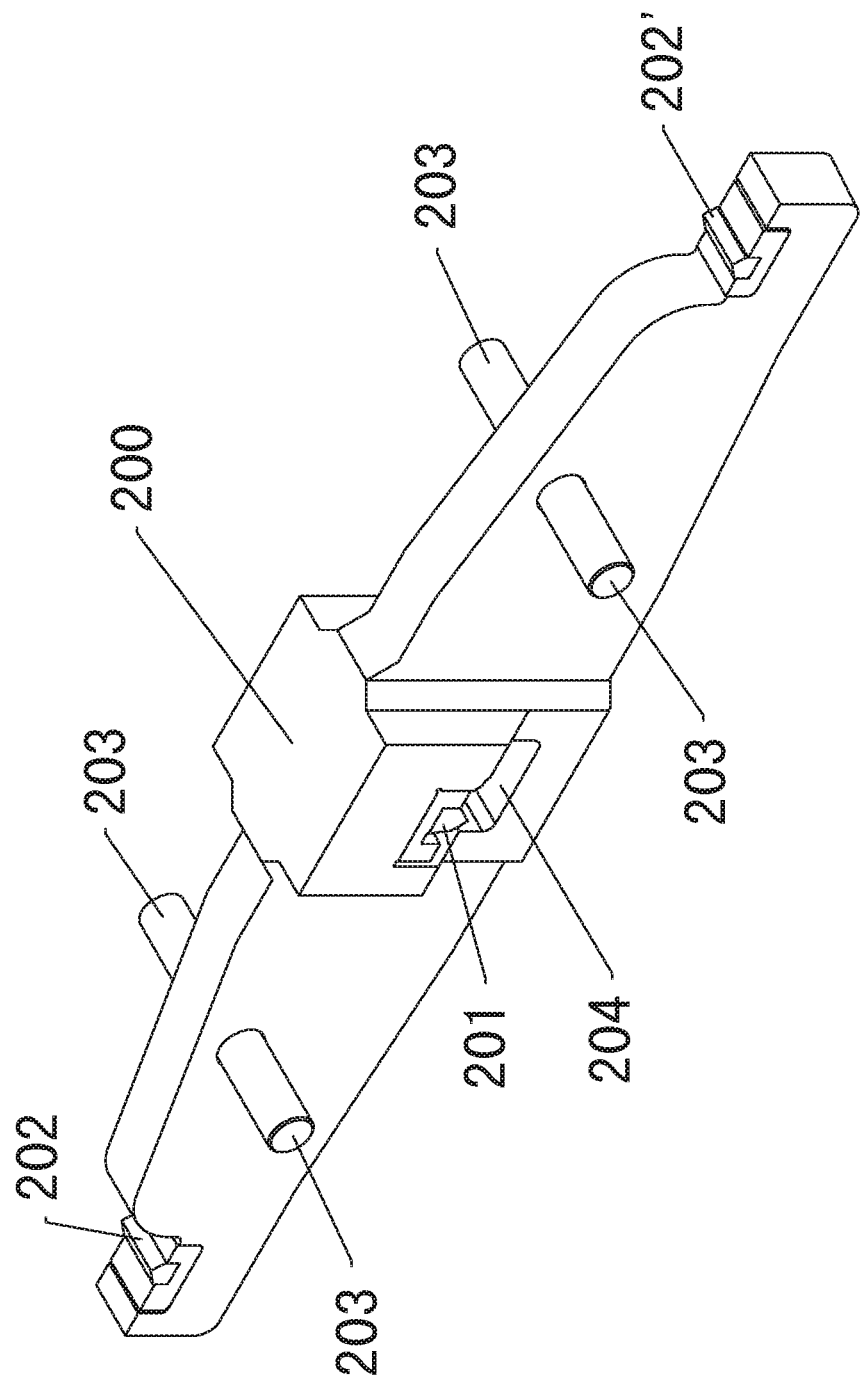
FIG. 3 is a perspective view of a main beam of the measuring device in FIG. 1.

FIG. 3 is a perspective view of the main beam 200 of the measuring device 1 in FIG. 1. As shown in the figure, the main beam 200 comprises the central knife 201, two side knives 202, 202', a supporting rod 203 and a central knife bearing opening 204. The central knife 201 is arranged at the center of the main beam 200 and preferably extends perpendicular to the direction of the main beam 200. The two side knives 202, 202' are arranged at the end of the main beam 200 and parallel with the central knife 201. The central knife 201 and the two side knives 202, 202' is adapted to be adjusted in parallelism with a three-coordinates measuring machine (not shown). The supporting rod 203 preferably extends outward from the main beam 200 perpendicular to the direction of the main beam 200. The supporting rod 203 is placed on the main beam motor 102, so that the main beam 200 is supported on the main frame 100 by means of the main beam motor 102. The central knife bearing opening 204 partially encloses the central knife 201 and penetrates through the main beam 200. The central knife bearing opening 204 is adapted to accommodate the central knife bearing 101, so that the supporting surface of the central knife bearing 101 is adapted to abut against the central knife edge 201A in a load condition of the main beam 200. As will be described in detail in the following, each of the two side knives 202, 202' is adapted to abut against a side knife groove 302A, 402A, preferably a supporting surface of the side knife groove 302A, 402A of a side knife bearing 302, 402 in a load condition of the balancing system 300 and the weighting system 400 by means of a corresponding side knife edge 202A, 202A' thereof.

Figure 4:
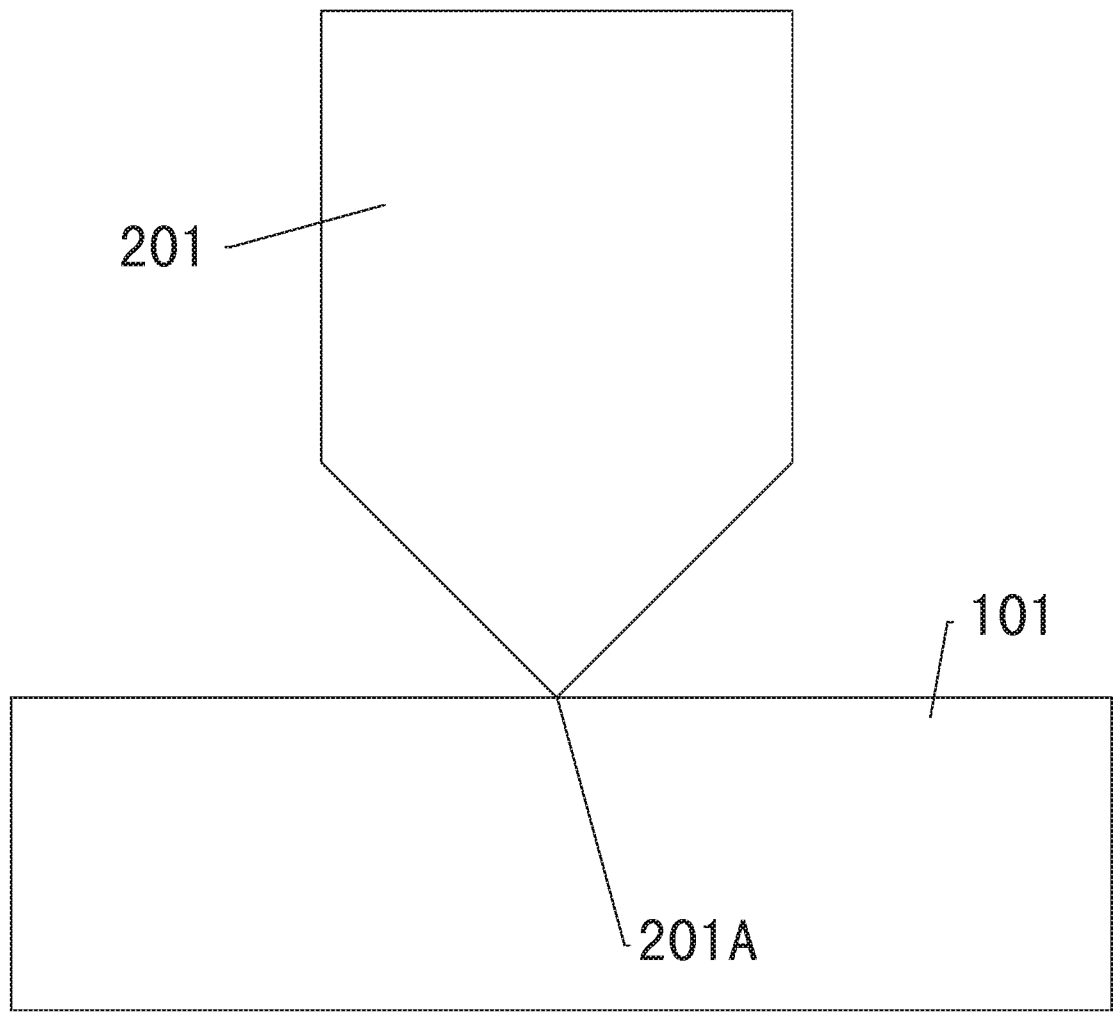
FIG. 4 is a cross-section of a central knife of the main beam in FIG. 3.

FIG. 4 is a cross-section of the central knife 201 of the main beam 200 in FIG. 3. In order to clearly depict the features of the central knife 201, FIG. 4 shows the central knife 201 and the central knife bearing 101 in the load condition of the main beam 200. The central knife 201 abut against a knife bearing surface of the central knife bearing 101 by means of the central knife edge 201A thereof in the load condition of the main beam 200. In order to increase the measuring capability of the measuring device 1 as much as possible while achieving an accurate measurement, the central knife edge 201A has an angle of about 90° between its adjacent sides.

In a possible embodiment, the central knife edge 201A has a baseline straightness of less than or equal to 0.006 mm. The central knife edge 201A has a bearing radius of less than or equal to 0.2 mm, and has a surface roughness of less than or equal to 0.025 μm. The supporting surface of the central knife bearing 101 has a flatness of less than or equal to 0.005 mm.

Figure 5:
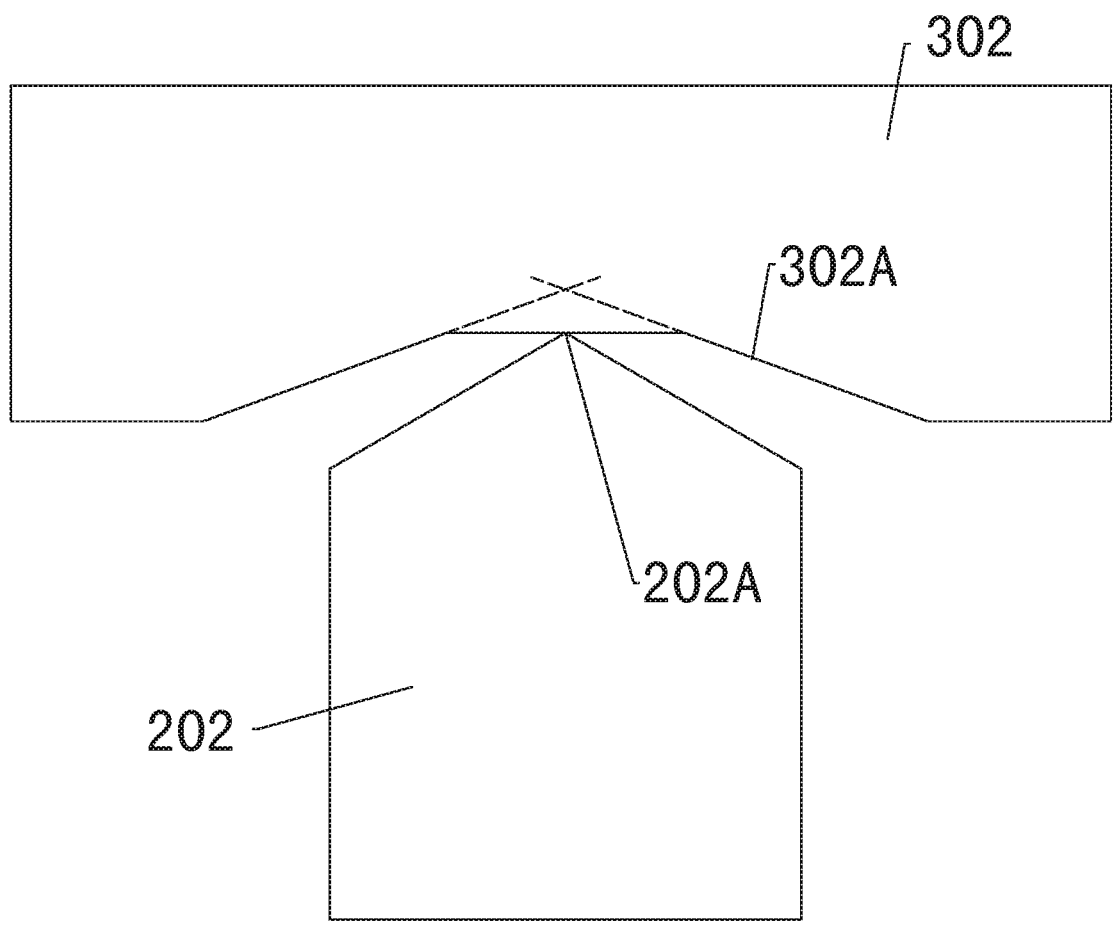
FIG. 5 is a cross-section of a side knife of the main beam in FIG. 3.

FIG. 5 is a cross-section of the side knife 202 of the main beam 200 in FIG. 3. It should be noted that the side knife 202 and the side knife 202' are identical, therefore only the side knife 202 is shown for the sake of clarity. In order to clearly depict the features of the side knife 202, FIG. 5 shows the side knife 202 and the side knife bearing 302 in the load condition of the balancing system 300. As shown in the figure, the cross-section of the side knife bearing 302 is different from the cross-section of the central knife bearing 101. In order to prevent the side knife 202, 202' and the corresponding side knife bearing 302, 402 from uncontrolled relative movement during a loading process of the balancing system 300 and the weighting system 400, a side knife groove 302A, 402A is arranged on a top surface of the side knife bearing 302, 402. The side knife groove 302A, 402A has a trapezoid cross-section. In the load condition of the balancing system 300, the side knife 202 abuts against the supporting surface of the side knife groove 302A by means of the side knife edge 202A thereof. The side knife edge 202A has an angle of about 120° between its adjacent sides. The side knife groove 302A has an angle of about 140° between its opposite sides.

In a possible embodiment, the side knife edge 202A has a baseline straightness of less than or equal to 0.01 mm. The side knife edge 202A has a bearing radius of less than or equal to 0.2 mm, and has a surface roughness of less than or equal to 0.025 μm. The supporting surface of the side knife groove 302A has a flatness of less than or equal to 0.005 mm.

Figure 6:
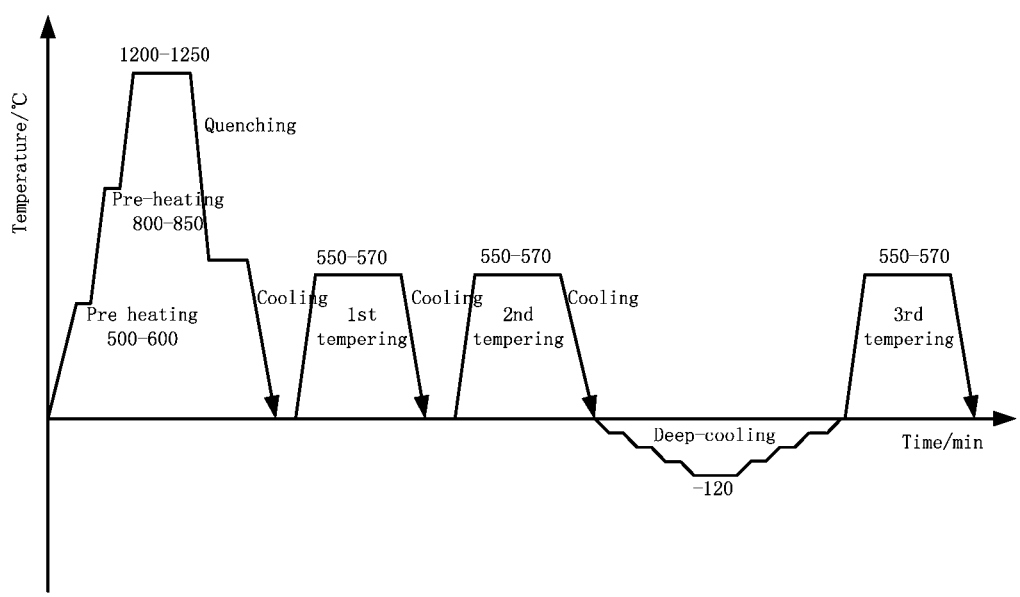
FIG. 6 is a schematic diagram of the heat treatment of the central knife and the side knife of the main beam in FIG. 3.

FIG. 6 is a schematic diagram of the heat treatment of the central knife 201 and the two side knives 202, 202' of the main beam 200 in FIG. 3. It should be noted that the heat treatments of the central knife 201 and the two side knives 202, 202' are identical; therefore the heat treatments are shown in one schematic diagram. In order to breakthrough the contradictory between the hardness and the toughness of metal in prior art, cemented carbide powder is chosen as a raw material of the central knife 201 and the two side knives 202, 202'.

The central knife 201 and the two side knives 202, 202' are made in a high temperature-cryogenic cycling process. During the high temperature-cryogenic cycling process, the central knife 201 and the two side knives 202, 202' experience a pre-heating process, a quenching process, multiple tempering processes, a deep cooling process and a final tempering process successively. During the pre-heating process, the central knife 201 and the two side knives 202, 202' are heated stepwise to 500 to 600° C., 800 to 850° C., and 1200 to 1250° C. successively. During the quenching process, the central knife 201 and the two side knives 202, 202' are quenched and cooled to room temperature by air. During the multiple tempering processes and the final tempering process, the central knife 201 and the two side knives 202, 202' are tempered to 550 to 570° C. and cooled to room temperature by air. During the deep cooling process, the central knife 201 and the two side knives 202, 202' are cooled stepwise to −120° C. and heated stepwise to room temperature. It should be noted that during the stepwise heating process, the central knife 201 and the two side knives 202, 202' have generally same heating time at each step temperature.

During the high temperature-cryogenic cycling process, the austenite of the central knife 201 and the two side knives 202, 202' is transformed into the Martensite completely, therefore increasing the hardness and the toughness thereof at the same time. The central knife 201 and the two side knives 202, 202' mounted on the main beam 200 acquire high parallelism of less than or equal to 0.02 mm based on the adjustment in parallelism of the central knife 201 and the two side knives 202, 202' with the three-coordinates measuring machine (not shown) in combination with an arc processing technique and a mirror grinding adjustment technique of the central knife edge 201A and the side knife edge 202A, 202A'. Therefore, the accuracy of the measuring device 1 during measurement can be ensured.

Figure 7:
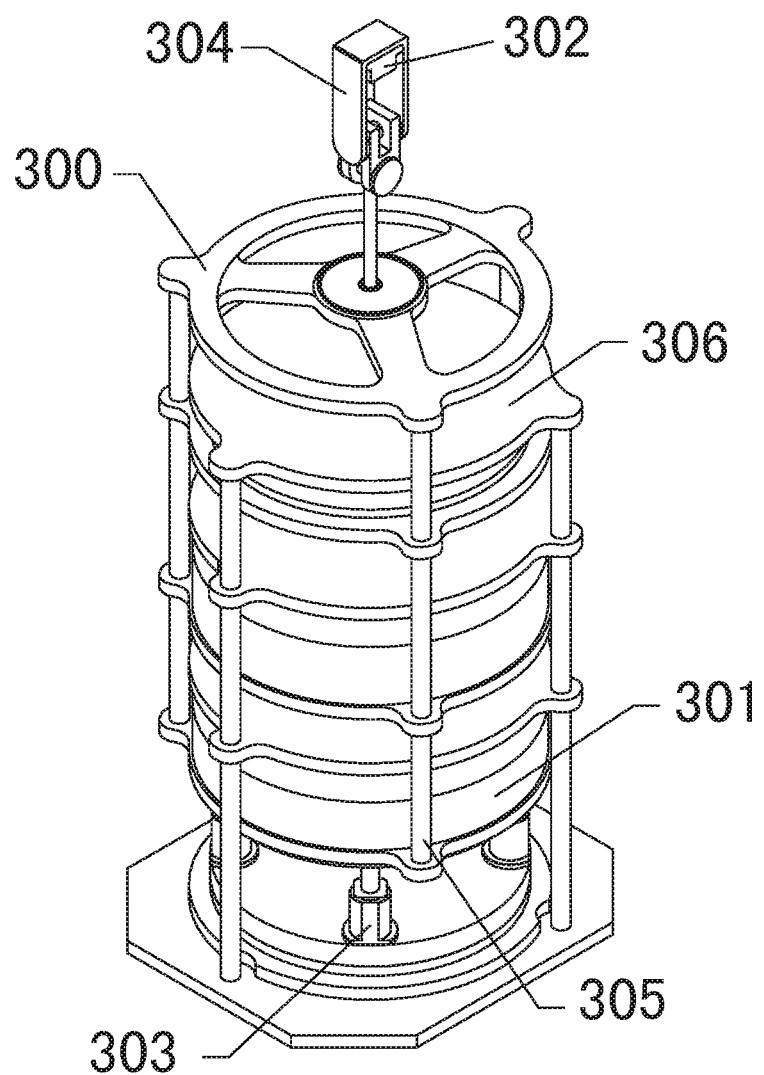
FIG. 7 is a perspective view of a balancing system of the measuring device in FIG. 1.

FIG. 7 is a perspective view of the balancing system 300 of the measuring device 1 in FIG. 1. As shown in the figure, the balancing system 300 comprises the side knife bearing 302, a side knife bearing connector 304, a counterweight carrier 305, a set of counterweights 301, a balancing hooking device 306 and a balancing motor 303. The side knife bearing 302 is engaged to the side knife bearing connector 304. One end of the side knife bearing connector 304 is connected to the top of the counterweight carrier 305. The counterweight carrier 305 is provided with one or more set of counterweights 301. The bottom of the counterweight carrier 305 is supported on the balancing motor 303. The balancing motor 303 is configured to lift the counterweight carrier 305 up and down, therefore lifting the side knife bearing connector 304 on the counterweight carrier 305 up and down, making the side knife bearing 302 on the side knife bearing connector 304 engage and disengage with the side knife 202, which achieves the loading and unloading of the balancing system 300. The balancing hooking device 306 is arranged in the counterweight carrier 305 for hooking the set of counterweights 301, so that the total mass of the counterweight carrier 305 changes to achieve a balancing effect.

Figure 8:
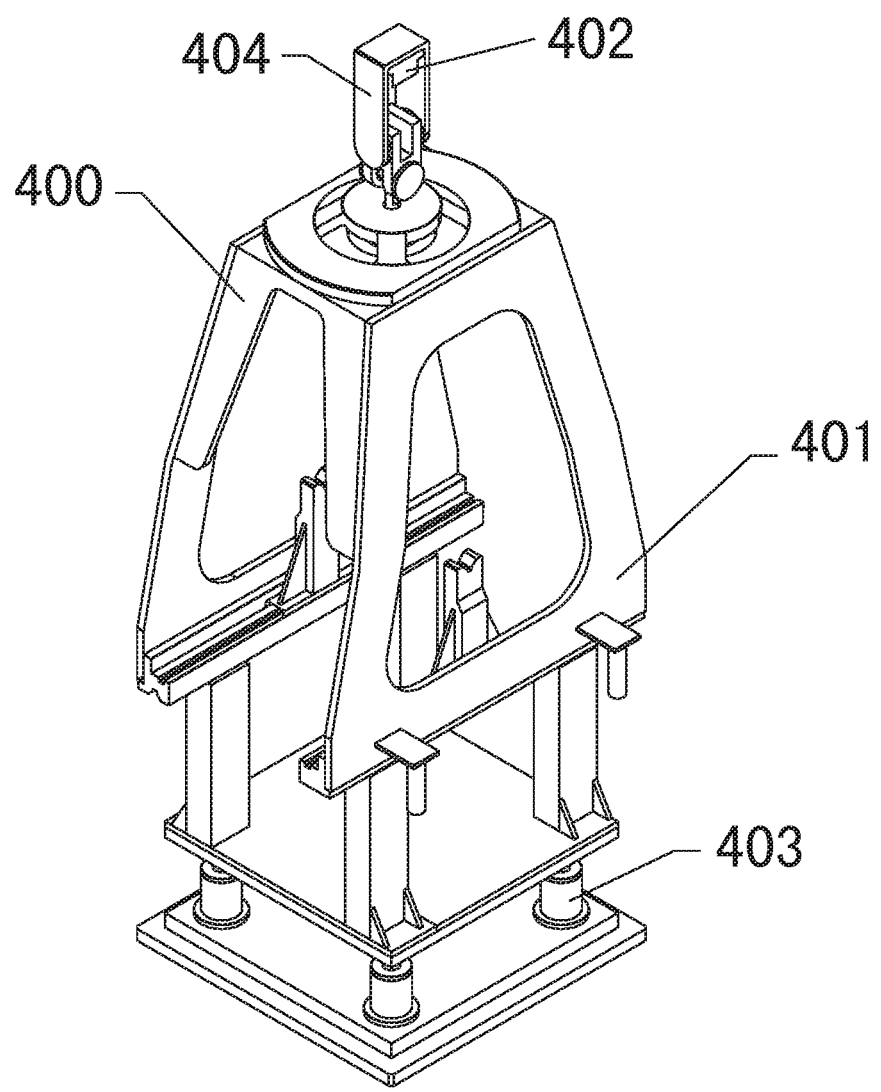
FIG. 8 is a perspective view of a weighting system of the measuring device in FIG. 1.

FIG. 8 is a perspective view of the weighting system 400 of the measuring device 1 in FIG. 1. As shown in the figure, the weighting system 400 comprises a weighting carrier 401, the side knife bearing 402, a side knife bearing connector 404, a weighting motor 403 and a detachable weight stand 405 with a recess on its top. The side knife bearing 402 is engaged to the side knife bearing connector 404. One end of the side knife bearing connector 404 is connected to the top of the weighting carrier 401. The bottom of the weighting carrier 401 is supported on the weighting motor 403. The weighting motor 403 is configured to lift the weighting carrier 401 up and down, therefore lifting the side knife bearing connector 404 on the weighting carrier 401 up and down, so that the side knife bearing 402 engages and disengages with the side knife 202' to achieve the loading and unloading of the weighting system 400. The weight stand 405 is configured to be mounted in or removed from the weighting system 400 on demand to adapt different shape of a test weight.

Figure 9:
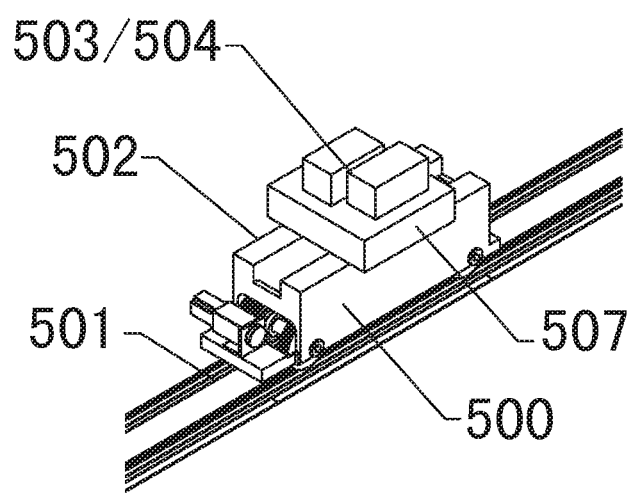
FIG. 9 is a perspective view of a weight transportation system of the measuring device in FIG. 1.

FIG. 9 is a perspective view of a weight transportation system 500 of the measuring device 1 in FIG. 1. As shown in the figure, the weight transportation system 500 comprises a transportation guide 501, a transportation vehicle 502, a standard weight 503 and the test weight 504. The test weight 504 has a generally cubic or cylindrical shape.

Figure 10:
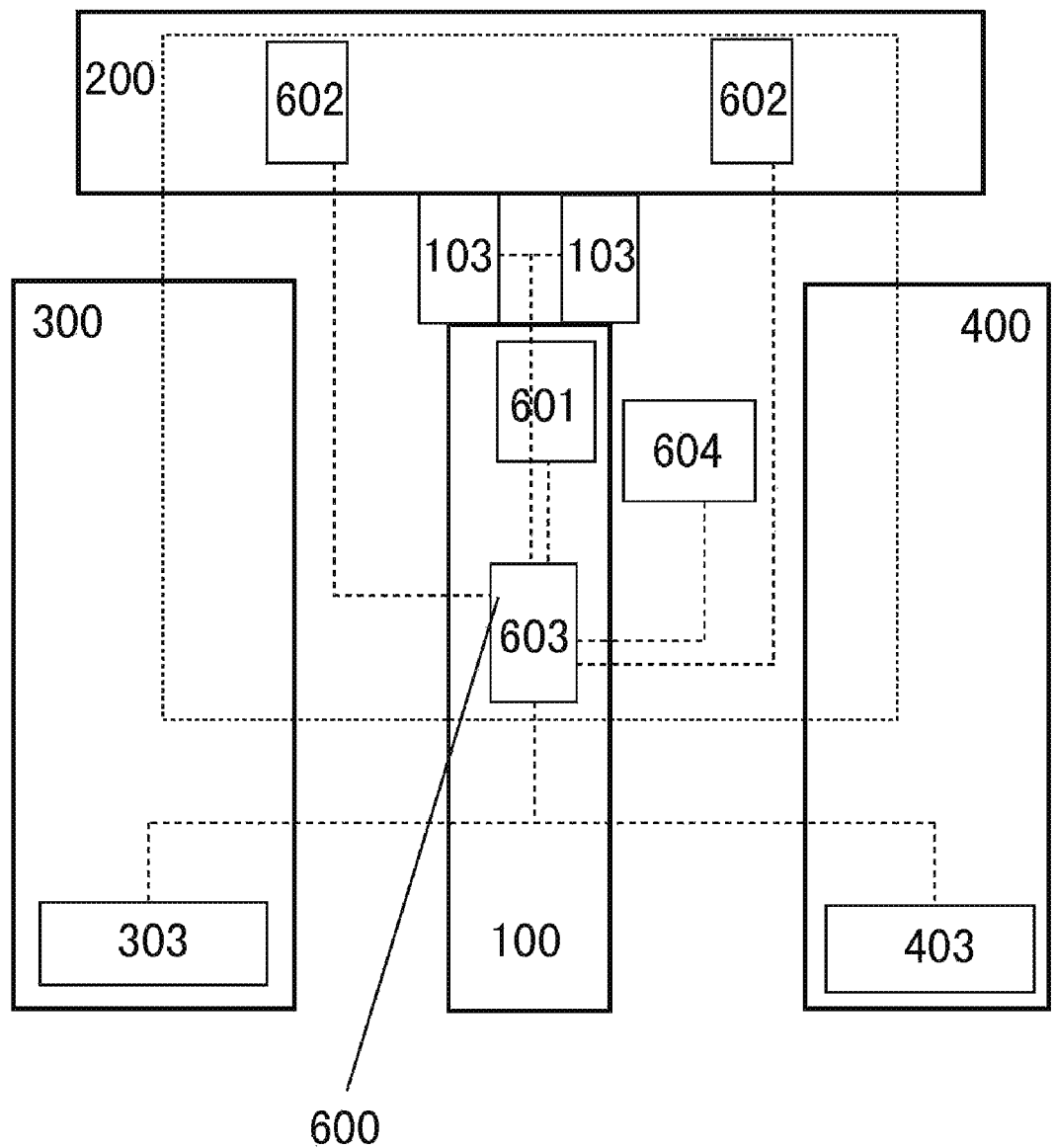
FIG. 10 is a schematic diagram of a control system of the measuring device in FIG. 1.

FIG. 10 is a schematic diagram of a control system 600 of the measuring device in FIG. 1. As shown in the figure, control system 600 comprises an optical sensor 601, a laser displacement sensor 602, a control unit 603 and a monitor 604. The optical sensor 601 is arranged inside the main frame 100 and adapted to measure the displacement of the main frame 100 by way of image processing (e.g. optical refraction). The laser displacement sensor 602 is arranged equidistantly on both sides of the main beam 200 and adapted to measure the displacement of the main frame 100 by way of laser displacement locating.

The control unit 603 is connected electrically to the optical sensor 601, the laser displacement sensor 603, the main beam motor 102, the balancing motor 303 and the weighting motor 403. The monitor 604 is connected to the control unit 603 for displaying the output of the optical sensor 601 and the laser displacement sensor 602 and other parameters of the measuring device 1. The control unit 603 is adapted to control the main beam motor 102, the balancing motor 303, the weighting motor 403 and the transportation vehicle 502.

In order to prevent the measurement accuracy from being affected by the main beam 200 swinging about the central knife edge during the loading and unloading process of the balancing system 300 and the weighting system 400, the control unit 603 adopts a synchronous control algorithm to achieve the synchronous loading and unloading of the balancing system 300 and the weighting system 400 on both ends of the main beam 200.

In order to prevent central knife 201 from damage due to an uneven stress between both sides of the central knife 201 during the loading and unloading process of the main beam 200, the control unit 503 adopts a force feedback control algorithm to accurately control the main beam motor 102, the balancing motor 303 and the weighting motor 403 to achieve a synchronous loading between both sides of the central knife 201 (i.e. the load generated by the balancing system 300 and the weighting system 400) during the lifting down process of the main beam 200.

While certain embodiments have been described, these embodiments have been presented by way of example only, and are not intended to limit the scope of the invention. The attached claims and their equivalents are intended to cover all the modifications, substitutions and changes as would fall within the scope and spirit of the invention.

The invention claimed is:

1. A measuring device for measuring the mass of a weight, comprising:
   a main frame,
   a main beam supported on the main frame and comprising a central knife and two side knives parallel with the central knife,
   a balancing system loaded on one end of the main beam and comprising a set of counterweights, a weighting system loaded on the other end of the main beam, a weight transportation system capable of transporting and loading a standard weight or a test weight into the weighting system and capable of unloading and transporting them away from weighting system, and a control system, wherein the central knife and the two side knives are made from metal with a high temperature-cryogenic cycling process, wherein the central knife and the two side knives is configured to be adjusted in parallelism with a three-coordinates measuring machine, wherein the control system is adapted to control the balancing system and the weighting system to synchronously load or unload the balancing system and the weighting system, and the metal comprises cemented carbide powder as raw material, the central knife and the side knife experience a pre-heating process, a quenching process, multiple tempering processes, a stepped deep cooling process and a final tempering process successively during the high temperature-cryogenic cycling process, and wherein the balancing system having at least one balancing motor and the weighting system having at least one weighting motor for the synchronous loading and unloading, of the balancing system and the weighting system.

2. The measuring device as claimed in claim 1, wherein the main frame comprises a central knife bearing with a rectangular cross-section, the central knife is adapted to abut against a supporting surface of the central knife bearing by means of its central knife edge, the balancing system and the weighting system both comprise a side knife bearing with a cross-section different from the cross-section of the central knife bearing, the side knife bearing has a side knife groove on its top surface, the side knife groove has a trapezoid cross-section, and the side knife is adapted to abut against the supporting surface of the side knife groove by means of a side knife edge.

3. The measuring device as claimed in claim 1, wherein the main frame further comprises a main beam motor capable of lifting the main beam up or down, and the control system is adapted to control the main beam motor to synchronously load or unload the loading on both sides of the central knife during the lift up or down process of the main beam.

4. The measuring device as claimed in claim 1, wherein the central knife and the side knife are heated stepwise to 500 to 600° C., 800 to 850° C., and 1200 to 1250° C. successively during the pre-heating process, the central knife and the side knife are quenched and cooled to room temperature by air during the quenching process, the central knife and the side knife are tempered to 550 to 570° C. and cooled to room temperature by air during the multiple tempering processes and the final tempering process, and the central knife and the side knife are cooled stepwise to about −120° C. and heated stepwise to room temperature during the deep cooling process.

5. The measuring device as claimed in claim 1, wherein the central knife edge has an angle of about 90° between its adjacent sides, the central knife edge has a baseline straightness of less than or equal to 0.006 mm, and the central knife edge has a bearing radius of less than or equal to 0.2 mm and a surface roughness of less than or equal to 0.025 µm.

6. The measuring device as claimed in claim 1, wherein a supporting surface of a central knife bearing has a flatness of less than or equal to 0.005 mm.

7. The measuring device as claimed in claim 1, wherein a side knife edge has an angle of about 120° between its adjacent sides, the side knife edge has a baseline straightness of less than or equal to 0.01 mm, and the side knife edge has a bearing radius of less than or equal to 0.2 mm and a surface roughness of less than or equal to 0.025 µm.

8. The measuring device as claimed in claim 1, wherein a side knife groove has an angle of about 140° between its opposing sides, and a supporting surface of the side knife groove has a flatness of less than or equal to 0.005 mm.

9. The measuring device as claimed in claim 1, wherein the test weight has a cubic or cylindrical shape.

* * * * *